Mar. 13, 1923. 1,448,663
C. A. HOYA
MANUFACTURE OF LINKS FOR DRIVE AND CONVEYER CHAINS
Filed July 23, 1921   3 sheets-sheet 1
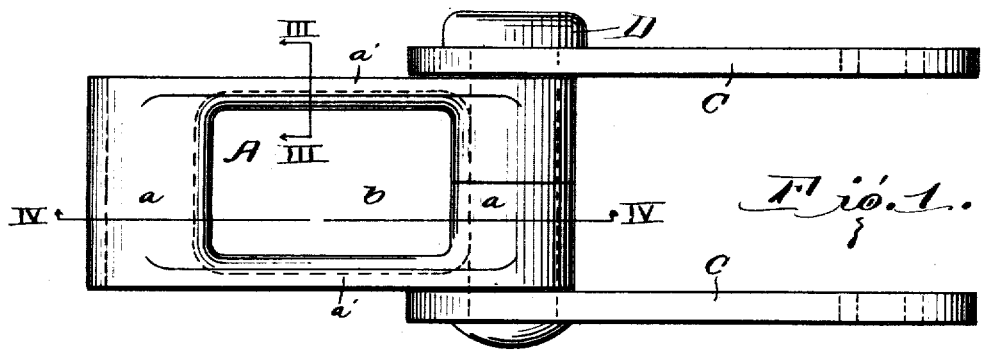
Fig. 1.
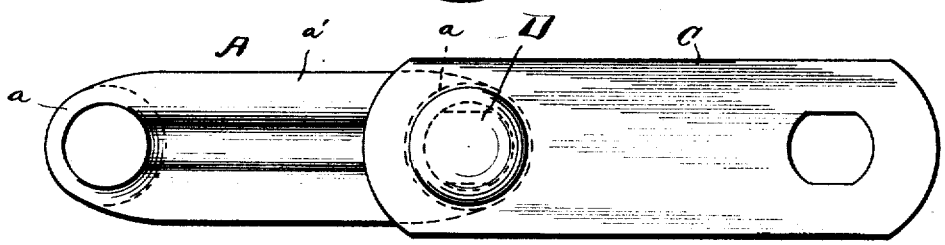
Fig. 2.
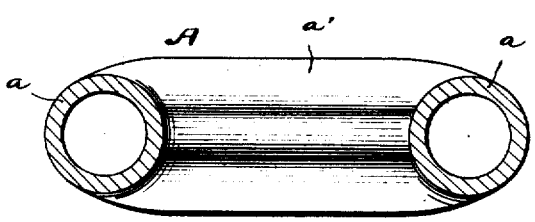
Fig. 4.
Fig. 3.
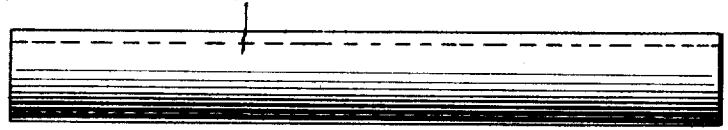
Fig. 5.
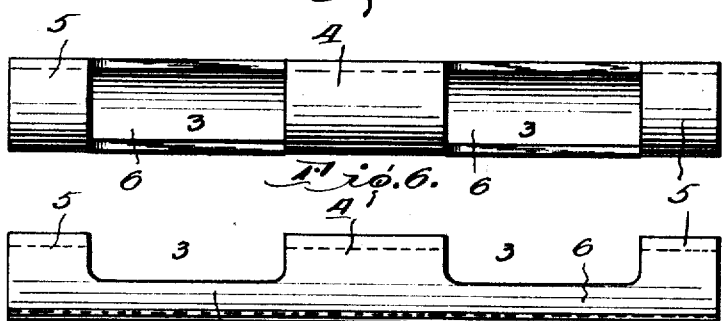
Fig. 6.
Fig. 7.
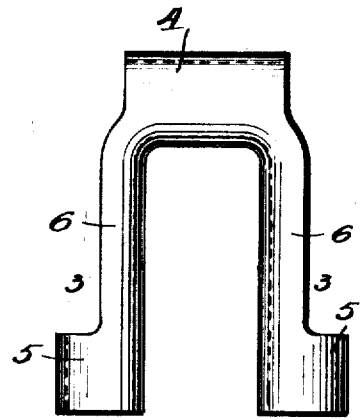
Fig. 8.
Inventor
Clarence A. Hoya.
By John S. Barker
Attorney
Fig. 15.
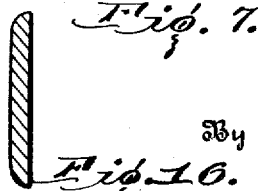
Fig. 16.

Mar. 13, 1923.
C. A. HOYA
MANUFACTURE OF LINKS FOR DRIVE AND CONVEYER CHAINS
Filed July 23, 1921
1,448,663
3 sheets-sheet 2
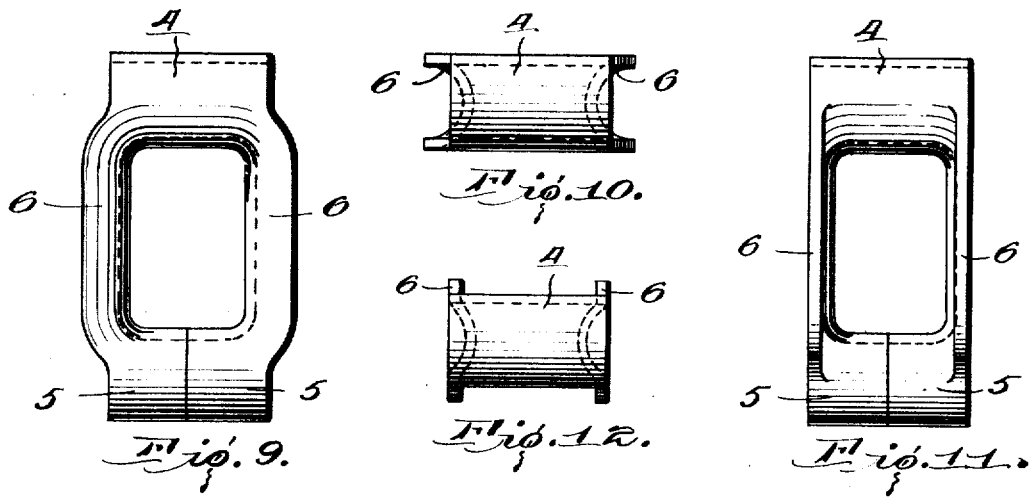
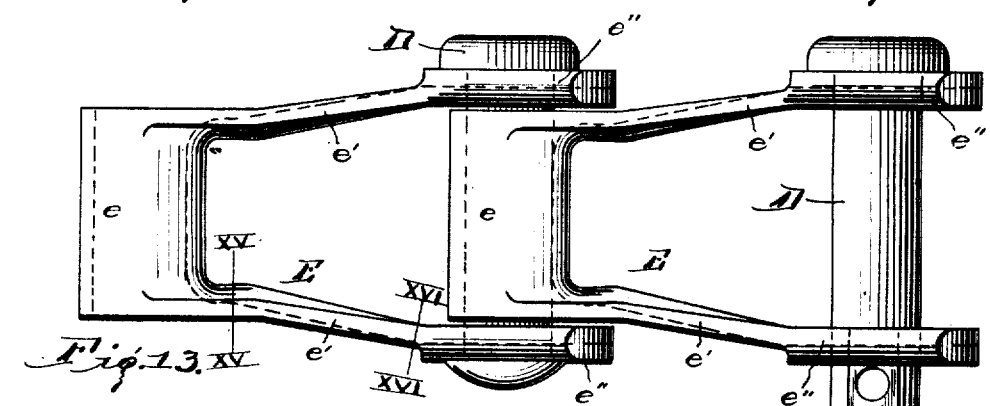
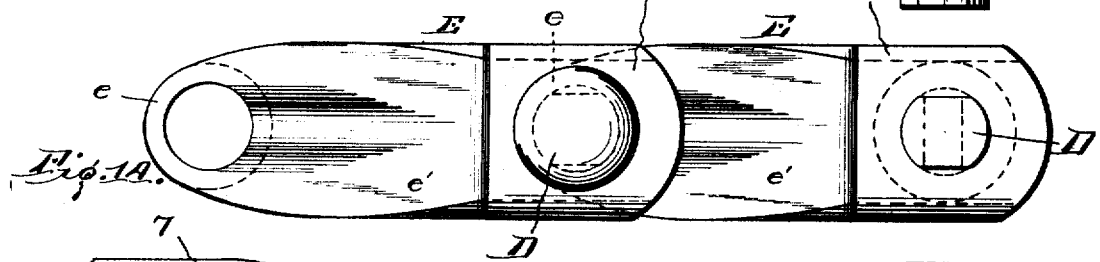
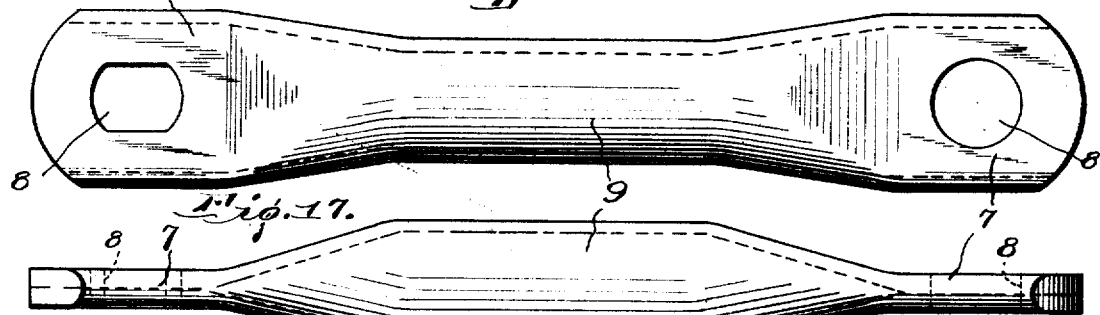
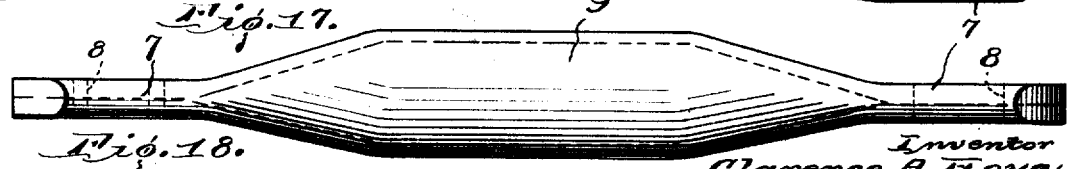

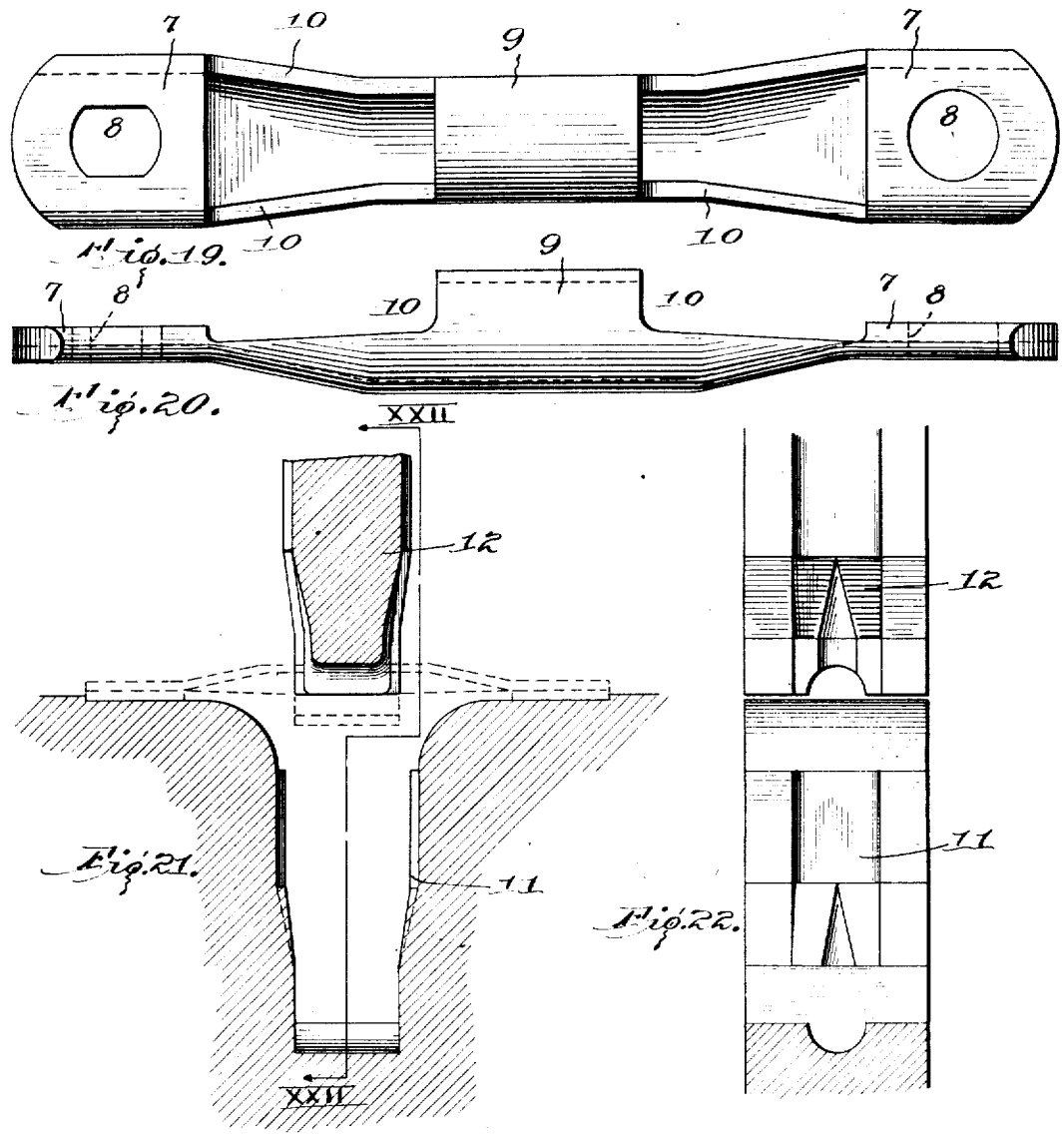

Patented Mar. 13, 1923.

1,448,663

UNITED STATES PATENT OFFICE.

CLARENCE A. HOYA, OF MILWAUKEE, WISCONSIN, ASSIGNOR TO CHAIN BELT COMPANY, OF MILWAUKEE, WISCONSIN, A CORPORATION OF WISCONSIN.

MANUFACTURE OF LINKS FOR DRIVE AND CONVEYER CHAINS.

Application filed July 23, 1921. Serial No. 487,023.

*To all whom it may concern:*

Be it known that I, CLARENCE A. HOYA, a citizen of the United States, residing at Milwaukee, in the county of Milwaukee and State of Wisconsin, have invented certain new and useful Improvements in the Manufacture of Links for Drive and Conveyer Chains, of which the following is a specification.

My invention relates to the manufacture of drive and conveyer chains made from steel or other malleable metal, and consists of a link for such chain of novel construction, and the process of manufacturing such links.

In the accompanying drawings—

Figure 1 is a plan view of a chain, the links A of which are made according to my present invention.

Fig. 2 is a side elevation of the chain.

Fig. 3 is a cross section through one of the side bars of the link A on the line III—III of Fig. 1.

Fig. 4 is a longitudinal section of the link on the line IV—IV of Fig. 1.

Figs. 5 to 12 illustrate the several steps followed in the manufacture of the link A of Fig. 1.

Fig. 13 is a plan view of a short section of chain formed of duplicate links made according to the present invention, but different from that shown at A in Fig. 1.

Fig. 14 is a side view of a section of chain shown in Fig. 13.

Fig. 15 is a cross section through one of the side bars of a link such as shown in Fig. 13, on the line XV—XV of that view.

Fig. 16 is a cross sectional view on the line XVI—XVI of Fig. 13.

Figs. 17 to 21, inclusive, illustrate the several steps in the manufacture of a link such as shown in Fig. 13.

Fig. 22 is a section taken on the line XXII—XXII of Fig. 21 showing only the dies used to shape the link.

Figs. 23 to 25, inclusive, illustrate a method of carrying out my invention including features not shown in any of the other views.

Referring to Figs. 1 and 2 of the drawings, A represents an integral link having at its opposite ends the tubular cross bars $a$, $a$, connected by parallel side bars $a'$, $a'$, these parts surrounding an opening $b$ through which may extend the sprocket tooth of a wheel with which the chain is adapted to operate. The chain is made up of a series of the links A alternating with connecting links C, C which may be formed of flat plates or bars of metal suitably perforated near their opposite ends. The perforations in the bar links C register with the openings through the hollow end bars of the links A, and connecting pintles D passing through such openings unite the links A and C, forming the chain. The type of chain here shown and described is old. Heretofore, however, so far as I am aware, the links of a chain of this kind when made integral have been formed by the casting process, and it is the purpose of my invention to produce this integral link A from steel or other bendable metal, by a process other than casting.

Such process I will now describe, making reference to Figs. 5 to 12 inclusive. A tube of steel or other suitable metal of the proper diameter and gage to form the links which it is desired to make is cut into pieces of proper length, as indicated by 2 in Fig. 5, this being the first operation. The next operation consists in removing from the short tube 2, two sections thereof, as indicated at 3—3 in Figs. 6 and 7. The sections removed are intermediate between a central tubular section 4, that is allowed to remain intact, and end tubular sections 5, 5, the portions removed amounting to practically a half of the metal of the tube at the cut portions so that the sections 6, 6, remaining between the tubular parts 4 and 5 are semi-cylindrical segments, as indicated by dotted lines in Fig. 10, for instance. One of the pieces 2 at this stage of the operation is represented in Figs. 6 and 7, those views illustrating it in two positions, one turned 90° relative to the other. The third operation consists in bending the blank formed by the second operation and represented in Fig. 8, this being the form represented in Fig. 8, this being accomplished by suitable dies or bending machinery. By this operation the sections 6, 6 are bent, where they join the central tubular portion 4 of the blank, until they are parallel with each other as represented in Fig. 8. The result of this, the third, operation, causes the blank to begin to have some of the appearances of the link A, for the central tubular part 4 now becomes a tubular end cross bar, between and uniting the parallel sections 6, 6, which correspond with and will presently become the side bars $a'$, $a'$, of the link A.

The fourth operation takes the partially formed link represented in Fig. 8 and advances it to the stage represented in Figs. 9 and 10 where the second tubular, end, cross bar of the link is formed, by the tubular sections 5, 5, being turned into line with each other and with the openings through them registering. This is accomplished by bending the side bars 6, 6, where they join the tubular end sections 5, 5, until the opposite ends of the blank 2—the outer ends of the tubular sections 5, 5 thereof—are caused to abut. In Fig. 9 the stage to which the link has been advanced by this, the fourth, operation, is represented in plan view, while in Fig. 10 it is shown in end elevation. These views show that the tubular central portion 4 of the blank of Figs. 6 and 7 forms one end bar of the link, the two end tubular sections 5, 5, together constitute the other end bar, and the intermediate sections 6, 6, constitute the side bars of the link. These latter are still semi-cylindrical, or approximately so, in cross section as represented in Fig. 10.

The next step in the formation of the link is the shaping of the side bars, which is accomplished by suitable dies or metal shaping mechanism, and the result of this, the fifth operation, is represented in Figs. 11 and 12 which show the link A in its final shape so far as external appearance is concerned, the side bars now being of the desired cross sectional form, as represented in Fig. 3. This is the fifth operation.

The sixth operation is to unite the two sections 5, 5, of the blank as by welding, to form an integral end bar, $a$. This sixth operation, however, is not absolutely necessary.

The seventh operation consists in broaching the barrels or tubular end bars of the link to bring their internal diameters to the desired size and smoothness and also to obtain correct pitch. The link is now completed and may be case-hardened or otherwise treated to fit it for the use to which it is to be put.

By the process described an integral steel link is easily, cheaply, and practically produced by comparatively few operations. Such a link is superior to an integral cast link, or to a multi-part link of the form shown, constructed of steel or other wrought metal.

The invention may be more or less modified to produce links of other shapes than that shown in Figs. 1 and 2.

In Figs. 13 and 14 is represented a chain formed of duplicate, integral, U-shaped, pintle-connected steel links E, E, each of which consists of a tubular end cross bar $e$ and a pair of side bars $e'$, $e'$. The end portions, $e''$, $e''$, of the side bars are perforated and are adapted to straddle the cross bar $e$ of an adjacent link, the openings through the cross bar and the end portions of the side bars registering to receive a connecting pintle D, by which adjacent links are united. This is a type of chain well known in the art and in common use. In manufacturing this link a tube of steel or other suitable metal is cut up into sections like those represented in Fig. 5. The next operation is to flatten the ends of the section of the tube as represented at 7, 7, Figs. 17 and 18, and to punch openings 8 through these flattened portions and trim their ends. The intermediate portion of the blank, between the flattened ends 7, 7, remains tubular as indicated at 9, in Figs. 17 and 18.

The next step, the third operation, consists in removing parts of the metal between the central cylindrical tubular section 9 and the flattened perforated end portions 7, as indicated at 10, 10 in Figs. 19 and 20. The blank thus formed is bent and shaped into a link E by suitable bending and shaping machinery, and in Figs. 21 and 22 I have shown bending dies adapted to give to the links by a single operation their final shape. This I term the fourth operation.

Referring to Figs. 21 and 22, 11 represents a female die and 12 a male die co-operating therewith. The male die is adapted to force the blank, shown in Figs. 19 and 20, and by dotted lines in Fig. 21, into the female die, and in so doing to shape the link. This is then finished by broaching the opening through the end cross bar $e$, and one of the perforations 8, to size to fit the cylindrical portion of the pintle D. The other perforation 8 is broached to fit the usual non-cylindrical portion of the pintle. The link is then, after being case-hardened or otherwise treated, ready for use.

In Figs. 23 to 25, inclusive, I illustrate a process of carrying out my invention in which a flat sheet or plate of metal such as illustrated in Fig. 23 is the stock material started with. From the opposite edges of such a sheet, of proper size to form a link, are removed portions as indicated at 13, Fig. 24. The flat blank thus formed is then rolled into cylindrical shape, as represented in Fig. 25, and the meeting edges 14 united forming a link-blank similar to that represented in Figs. 6 and 7 of the drawings hereof. Taking this blank the several operations that have been described to form the link A of Fig. 1 may be carried out as has been described.

It will thus be seen from the description that my invention may be variously modified, as the nature of the stock material started with or the form of link eventually to be produced, may require. It will be noticed that in each of the several methods of procedure that have been described there is produced as an intermediate article a link-blank of wrought metal capable of being shaped into a finished link, which blank is of straight-line formation from end to end and comprises a central tubular portion, with reduced sections on either side thereof, the central portion eventually forming a tubular cross bar of the finished link and the reduced sections the side bars of such link, and the reduced sections having in their end portions openings adapted to be brought into line with each other in the finished link to receive the connecting means of the chain, as for instance, a pintle D. Such a link-blank is shown in Figs. 6, 7, 19, 20 and 25 of the drawings of this case.

What I claim is:—

1. A wrought metal blank from which to make a chain link, consisting of a central tubular portion and reduced sections on either side thereof, the blank being of straight line formation from end to end, the central portion thereof being arranged to form a tubular end bar of the completed link and the reduced sections the side bars of the link united by the tubular end bar, the end portions of the said reduced sections having openings through them adapted to be brought into line with each other to receive link-connecting means of a chain, in the finished link.

2. The herein described step in the process of making a chain link from a blank such as described in claim 1, which consists in bending the reduced sections at their connections with the central tubular portion so that they are each at an angle to the central tubular portion approximating a right angle, to constitute the opposite side bars.

3. The herein described steps in the process of making a chain link having a tubular end bar and opposite side bars united thereby, which consists in taking a piece of tubular metal of proper length, removing portions thereof to form a link blank with reduced sections on either side of a central tubular part, bending the said reduced sections to form the opposite side bars of the link, with the central tubular portion extending transversely between them to constitute the cross bar of the link, and shaping the ends of the blank to constitute the end of the link opposite the tubular cross bar.

4. The herein described steps in the making of a chain link, which consist in taking a piece of tubular metal of proper length, removing intermediate portions thereof to form a straight link-blank, with a central tubular portion, opposite end tubular portions, and intermediate reduced portions, bending the reduced portions where they join the central tubular portion so they are opposite each other and the central tubular portion is transversely between and uniting them, and further bending the reduced portions so that the tubular end parts of the blank are brought together end to end with the openings through these parts in line with each other.

5. The added step to the process described in claim 4 which consists in uniting together the abutting ends of the tubular end portions of the blank after they have been brought in line with each other.

6. The added step to the process described in claim 4 which consists in shaping the reduced and opposite portions of the blank, to form the side bars of the link.

7. An integral or one-piece link for drive and conveyer chain formed of wrought metal having a tubular cross, end bar and opposite side bars, the metal of the link where the side bars and cross bars unite being bent.

8. A one-piece link for drive and conveyer chain, having at each of its ends a tubular cross bar, these being united by opposite side bars, the metal of the side bars where they unite with the end bars being bent.

9. A one-piece link for drive and conveyer chain having a tubular end bar and opposite side bars, the cross sectional size of the side bars being approximately one-half that of the tubular end bar and the metal of the side bars where they unite with the tubular end bar being bent so the side bars are approximately at right angles to the cross bar.

10. A one-piece link for drive and conveyer chain formed of wrought metal, having a tubular cross bar at each end and opposite side bars connecting the cross bars, the metal of the side bars being bent adjacent to where such bars unite with the cross bars so that the side and cross bars are at substantially right angles to each other.

CLARENCE A. HOYA.